Patented Oct. 18, 1949

2,485,510

UNITED STATES PATENT OFFICE 2,485,510

PREPARATION OF ACRYLIC ACID AND ESTERS THEREOF

Bryan C. Redmon, Amherst, Mass., assignor to American Cyanamid Company, New York, N. Y., a corporation of Maine No Drawing. Application February 13, 1946, Serial No. 647,427

4 Claims. (Cl. 260—486)

This invention relates to the preparation of acrylic acid and acrylic acid esters. More particularly, it relates to the dehydration of dihydracrylic acid or esters thereof to produce the corresponding acrylic acid compound.

I have discovered that if dihydracrylic acid or an ester of dihydracrylic acid is heated in liquid or vapor phase to dehydration temperatures in the presence of a neutral, acid or basic dehydration catalyst, with or without the addition of a polymerization inhibitor as desired, acrylic acid or an ester of acrylic acid may be obtained in a very pure state. The general reaction may be represented as follows:

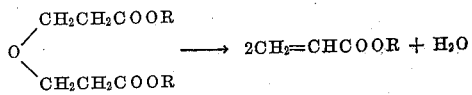

where R is hydrogen or alkyl.

The following examples in which the proportions are given in parts by weight unless otherwise indicated are illustrative only, and they are not intended to restrict the scope of the invention to the details therein set forth.

Example 1

| | Parts |
|---|---|
| Dimethyl dihydracrylate | 106 |
| Phosphoric acid (85%) | 40 |
| Copper powder | 2 |

The dimethyl dihydracrylate is fed continuously into a mixture of the phosphoric acid and copper powder which has been heated to about 150° C. in a suitably equipped reaction vessel. In order to obtain a sufficiently rapid reaction, the temperature of the catalyst is raised to about 185° C. during the run.

A clear, colorless, homogeneous liquid starts to distill over at a distilling head temperature of about 60° C. which temperature slowly rises to about 85° C. as the reaction proceeds and the distillation rate increases. 56.5 parts (53.3% of the weight of the original dimethyl dihydracrylate) of product which contains 72.1% or 42.2 parts of methyl acrylate is obtained.

The crude distillate is washed with a saturated sodium chloride solution and 31 parts of the purified product is fractionally distilled. After a forerun containing 7 parts of methanol, water and methyl acrylate is obtained at 68–74° C., 22 parts of substantially pure methyl acrylate are collected between 78° C. and 82.5° C.

Example 2

| | Parts |
|---|---|
| Dimethyl dihydracrylate | 106 |
| Anhydrous zinc chloride | 25 |
| Copper powder | 2 |

25 parts of the dimethyl dihydracrylate, the zinc chloride and copper powder are heated to boiling in a suitable reaction vessel. The remaining 86 parts of dimethyl dihydracrylate is fed slowly into the hot catalyst mixture which, for the major part of the run, is maintained at about 203°–210° C. The initial distilling head temperature is about 58° C. but this rises to about 105° C. at the end of the run.

52.6 parts of a clear water-white distillate containing 71.5% or 37.6 parts of pure methyl acrylate is collected. This distillate is washed with saturated sodium chloride solution and 27.5 parts thereof are fractionally distilled. 10 parts of forerun containing methanol, water-methyl acrylate are collected at from 64°–78° C. and then 16 parts of pure methyl acrylate boiling between 79° and 82.5° C. is obtained.

Example 3

| | Parts |
|---|---|
| Diethyl dihydracrylate (98%) | 200 |
| Alundum pellets (81 mesh) | 400 |
| Solution thorium nitrate | per cent 17 |
| Concentrated ammonium hydroxide (28% NH$_3$) | 22.5 |
| Water | 200 |

A catalyst is prepared by soaking the Alundum pellets in the thorium nitrate solution for about 12 hours at about 100° C. The solution is decanted, and the wet pellets are soaked in a solution of the ammonium hydroxide in the water for 4 hours at 100° C. The catalyst is thoroughly washed with water by decantation, dried and heated at 450° C. for 10 hours in a slow current of air. 2.1 parts of ThO$_2$ (equivalent to 4.4 parts of the original Th(NO$_3$)$_4$.4H$_2$O are absorbed on the Alundum pellets.

The catalyst prepared as described above is packed into a catalyst tube which is equipped with any suitable heating means and means for maintaining a constant temperature throughout the bed of catalyst.

The diethyl dihydracrylate is vaporized in a flash vaporizer maintained at about 300° C. and the vapors therefrom passed upward through the packed catalyst tube in which the catalyst has been heated to about 460°–480° C.

Mixed vapors of the product, collected at still head temperatures of from 80°–100° C., are passed through a Vigreux column to fractionate out and return to the reaction vessel if desired, unreacted dihydracrylic ester, and 137 parts of a homogeneous product containing about 36% ethyl acrylate are obtained representing a yield of 26.8%.

The crude ethyl acrylate product is purified by fractional distillation. 27 parts of distillate containing 71.6% ester are collected as the first fraction at from about 81°–94.5° C., 23 parts collected at from about 98°–121° C. contain 32.7% ester; and the final fraction, 26 parts collected at from 135°–145° C., contains 7.1% ester.

*Example 4*

| | Parts |
|---|---|
| Diethyl dihydracrylate | 194 |
| Activated alumina | 270 |

The procedure of Example 3 is followed. The ester is flash vaporized at about 300°–330° C. and the vapors therefrom passed continuously for about 6½ hours upwardly through a tube packed with the activated alumina catalyst which has been heated to about 300°–313° C.

Mixed vapors of the product, collected at a still head temperature of about 70°–75° C., are passed through a Vigreux column to fractionate out unconnected diethyl dihydracrylate and 165 parts of a colorless heterogeneous representing a yield of 73.6% distillate is obtained. The upper layer of the distillate, 157 parts, contains 83.9% ethyl acrylate and may be purified by fractional distillation.

Upon distillation of the crude product, 81 parts of distillate collected at 76°–79.5° C. contain 65.2% ethyl acrylate; 44 parts collected at 80.5°–93.0° C. contain 75.2% ester; and 21 parts collected at 93°–102° C. contain 92.9% ester.

*Example 5*

| | Parts |
|---|---|
| Dimethyl dihydracrylate | 159 |
| Activated alumina | 299 |

The procedure of Examples 3 and 4 is followed, the dimethyl dihydracrylate being vaporized at about 315°–345° C., the still head temperature ranging from about 50°–70° C. and the catalyst being maintained at about 300°–310° C.

121 parts of a homogeneous product which contains 70.5% methyl acrylate are obtained, a yield of 54%.

The dihydracrylic esters used in the preceding examples may, if desired, be prepared by reaction of ethylene cyanohydrin and acrylonitrile to produce $\beta,\beta'$-dicyanodiethyl ether which is then hydrolyzed and esterified. Any other suitable method may, of course, be substituted and other esters such as the n-propyl, isopropyl, n-butyl, isobutyl, n-amyl, isoamyl, hexyl, 2-ethylhexyl, octyl, decyl, dodecyl, octadecyl, benzyl, phenylethyl, etc., may be substituted for the methyl and ethyl of the examples. Moreover, while the examples have all described the dehydration of dihydracrylic acid esters, dihydracrylic acid esters, dihydracrylic acid itself may be subjected to the same dehydration reaction to produce acrylic acid.

My invention is not limited to the use of any particular dehydration catalyst. I may use an acid catalyst such as phosphoric acid, sulfuric acid, zinc chloride, sodium bisulfate, boric acid, boric anhydride, phosphorus pentoxide, etc., a neutral catalyst such as alumina, ferric oxide ($Fe_2O_3$), bauxite, titania, thoria, etc., or a basic catalyst such as calcium oxide, calcium hydroxide, magnesium oxide, borax, disodium phosphate, sodium methoxide, etc. In general, I prefer to use neutral type catalysts such as activated alumina when the reaction is carried out in the vapor phase and I prefer the use of neutral type catalysts when dehydrating dihydracrylic acid esters since hydrolysis of the esters which occurs to some extent in the presence of an acid catalyst is thereby avoided. However, these preferences are merely specific embodiments of my invention and other dehydration catalysts of the types listed above may be used to advantage.

The temperature at which the process of my invention is carried out is preferably the lowest possible temperature at which a continuous dehydration can be maintained. Obviously, this temperature will not be constant but will depend upon the ester being hydrated, the particular catalyst employed, the type of reaction, i. e., vapor or liquid phase, or other variable factors. For instance, as will be apparent from the examples, the use of a thoria catalyst in a vapor phase reaction requires a temperature of about 460°–480° C. Alumina, on the other hand, in a similar reaction may be maintained effectively in the neighborhood of from about 270°–330° C. preferably between 290°–310° C., while liquid phase dehydrations with acid type catalysts may be carried out at temperatures around 200° C.

Polymerization inhibitors other than powdered copper may be present in the reaction mixture. Equally useful are manganese, and manganous salts, chromium, and chromium salts, hydroquinone, the methyl and ethyl ethers of hydroquinone, pyrogallol, catechol, tertiary butyl catechol, phloroglucinol, etc. It is not necessary, however, that a polymerization inhibitor be present at all in the reaction mixture.

The present invention possesses many advantages over prior art processes particularly insofar as it relates to the preparation of acrylic acid esters. In the past, these esters have been obtained by direct esterification of acrylic acid with the appropriate alcohol. The three-fold excess of alcohol used, necessary in order that a practical yield of ester be obtained, made separation and purification of the ester from the reaction products and unconverted reactants a problem. Fractionation was inefficient not only because of the tendency of the ester to polymerize but also because an alcohol fraction could not be obtained free of ester, the respective boiling points being in the same range. All of these disadvantages are avoided by my invention which does not require esterification of acrylic acid with an alcohol and hence there is no free alcohol in the ester product to be removed.

It is another advantage of the present invention that the dehydration process may be carried out continuously by recycling unconverted dihydracrylic acid or ester. It is only necessary that the catalyst be regenerated periodically. This can be done by blowing with air, etc.

I claim:

1. The process of preparing an ester of acrylic acid which comprises heating an ester of dihydracrylic acid to dehydration temperature in the presence of a neutral dehydration catalyst, the reaction being conducted in the vapor phase.

2. A process according to claim 1 in which the dehydration temperature is from about 270° C. to about 330° C.

3. A process of preparing methyl acrylate which comprises passing vapors of dimethyl dihydracrylate through activated alumina maintained at a temperature of from about 290° C. to about 310° C.

4. A process of preparing ethyl acrylate which comprises passing vapors of diethyl dihydracrylate through activated alumina maintained at a temperature of from about 290° C. to about 310° C.

BRYAN C. REDMON.

REFERENCES CITED

The following references are of record in the file of this patent:

UNITED STATES PATENTS

| Number | Name | Date |
|---|---|---|
| 2,341,663 | Schulz | Feb. 15, 1944 |
| 2,376,704 | Kung | May 22, 1945 |
| 2,390,028 | Neher et al. | Nov. 27, 1945 |

OTHER REFERENCES

Beckman, Morrell, Egloff: "Catalysis," page 746 (1940), Reinhold Publishing Corporation, New York.